(12) United States Patent
Erden et al.

(10) Patent No.: US 10,332,547 B1
(45) Date of Patent: Jun. 25, 2019

(54) DATA STORED USING PERPENDICULAR AND LONGITUDINAL MAGNETIC FIELDS OVER MORE THAN TWO ADJACENT TRACKS

(71) Applicant: Seagate Technology LLC, Cupertino, CA (US)

(72) Inventors: Mehmet Faith Erden, St. Louis Park, MN (US); Krishnan Subramanian, Shakopee, MN (US); Walter R. Eppler, Cranberry Township, PA (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 16/048,864

(22) Filed: Jul. 30, 2018

(51) Int. Cl.
G11B 5/09 (2006.01)
G11B 5/012 (2006.01)
G11B 21/00 (2006.01)

(52) U.S. Cl.
CPC ............ *G11B 5/012* (2013.01); *G11B 21/006* (2013.01)

(58) Field of Classification Search
None
See application file for complete search history.

(56) References Cited

U.S. PATENT DOCUMENTS

| | | | |
|---|---|---|---|
| 4,803,571 A | 2/1989 | Fujioka et al. | |
| 5,956,216 A | 9/1999 | Chou | |
| 6,188,535 B1 * | 2/2001 | Lemke | G11B 5/0086 360/70 |
| 6,236,627 B1 * | 5/2001 | Verboom | G11B 7/00745 369/275.4 |
| 6,256,177 B1 * | 7/2001 | Urai | B82Y 10/00 360/324.12 |
| 6,266,205 B1 * | 7/2001 | Schreck | B82Y 10/00 360/77.02 |
| 9,818,445 B2 | 11/2017 | Zhu et al. | |
| 9,824,703 B2 | 11/2017 | Sugawara et al. | |
| 2003/0234998 A1 * | 12/2003 | Magnusson | G11B 5/0086 360/64 |
| 2005/0162786 A1 * | 7/2005 | Meguro | G11B 5/3912 360/324.2 |
| 2014/0160590 A1 * | 6/2014 | Sankaranarayanan | G11B 5/09 360/45 |

* cited by examiner

*Primary Examiner* — Peter Vincent Agustin
(74) *Attorney, Agent, or Firm* — Hollingsworth Davis, LLC (57) ABSTRACT

A first reader spans first and second tracks of a recording medium and provides a first signal responsive to a first total longitudinal field of the first and second tracks. A second read spans two other tracks, at least one of the two other tracks being different from the first and second tracks. The second reader provides a second signal responsive to a second total longitudinal field of the two other tracks. A third reader spans two or more of the tracks and provides a third signal responsive to a total perpendicular field of the two or more tracks. User data is decoded from the first, second, and third signals.

20 Claims, 12 Drawing Sheets

| b1$_n$ | b2$_n$ | b3$_n$ | r1$_n$ | r2$_n$ | r3$_n$ |
|---|---|---|---|---|---|
| 1 | 1 | 1 | 0 | 0 | 2 |
| 1 | 1 | -1 | 0 | 2 | 0 |
| 1 | -1 | 1 | 2 | -2 | 0 |
| 1 | -1 | -1 | 2 | 0 | -2 |
| -1 | 1 | 1 | -2 | 0 | 2 |
| -1 | 1 | -1 | -2 | 2 | 0 |
| -1 | -1 | 1 | 0 | -2 | 0 |
| -1 | -1 | -1 | 0 | 0 | -2 |

| b1$_n$ | b2$_n$ | b3$_n$ | r1$_n$ | r2$_n$ | r3$_n$ | c1$_n$ | c2$_n$ | c3$_n$ |
|---|---|---|---|---|---|---|---|---|
| 1 | 1 | 1 | 0 | 0 | 2 | 1 | 1 | 1 |
| 1 | 1 | -1 | 0 | 2 | 0 | 1 | 1 | 0 |
| 1 | -1 | 1 | 2 | -2 | 0 | 0 | 0 | 1 |
| 1 | -1 | -1 | 2 | 0 | -2 | 0 | 0 | 0 |
| -1 | 1 | 1 | -2 | 0 | 2 | 0 | 1 | 1 |
| -1 | 1 | -1 | -2 | 2 | 0 | 0 | 1 | 0 |
| -1 | -1 | 1 | 0 | -2 | 0 | 1 | 0 | 1 |
| -1 | -1 | -1 | 0 | 0 | -2 | 1 | 0 | 0 |

| b1$_n$ | b2$_n$ | b3$_n$ | r1$_n$ | r2$_n$ | r3$_n$ | c1$_n$ | c2$_n$ | c3$_n$ |
|---|---|---|---|---|---|---|---|---|
| 1 | 1 | 1 | 0 | 0 | 2 | 1 | 1 | 1 |
| 1 | 1 | -1 | 0 | 2 | 1 | 1 | 1 | 0 |
| 1 | -1 | 1 | 2 | -2 | 0 | 0 | 0 | 1 |
| 1 | -1 | -1 | 2 | 0 | -1 | 0 | 0 | 0 |
| -1 | 1 | 1 | -2 | 0 | 1 | 0 | 1 | 1 |
| -1 | 1 | -1 | -2 | 2 | 0 | 0 | 1 | 0 |
| -1 | -1 | 1 | 0 | -2 | -1 | 1 | 0 | 1 |
| -1 | -1 | -1 | 0 | 0 | -2 | 1 | 0 | 0 |

| b1ₙ | b2ₙ | b3ₙ | b4ₙ | r1ₙ | r2ₙ | r3ₙ |
|---|---|---|---|---|---|---|
| 1 | 1 | 1 | 1 | 0 | 0 | 3 |
| 1 | 1 | 1 | -1 | 0 | 2 | 1 |
| 1 | 1 | -1 | 1 | 0 | -2 | 1 |
| 1 | 1 | -1 | -1 | 0 | 0 | -1 |
| 1 | -1 | 1 | 1 | 2 | 0 | 1 |
| 1 | -1 | 1 | -1 | 2 | 2 | -1 |
| 1 | -1 | -1 | 1 | 2 | -2 | -1 |
| 1 | -1 | -1 | -1 | 2 | 0 | -3 |
| -1 | 1 | 1 | 1 | -2 | 0 | 3 |
| -1 | 1 | 1 | -1 | -2 | 2 | 1 |
| -1 | 1 | -1 | 1 | -2 | -2 | 1 |
| -1 | 1 | -1 | -1 | -2 | 0 | -1 |
| -1 | -1 | 1 | 1 | 0 | 0 | 1 |
| -1 | -1 | 1 | -1 | 0 | 2 | -1 |
| -1 | -1 | -1 | 1 | 0 | -2 | -1 |
| -1 | -1 | -1 | -1 | 0 | 0 | -3 |

DATA STORED USING PERPENDICULAR AND LONGITUDINAL MAGNETIC FIELDS OVER MORE THAN TWO ADJACENT TRACKS

SUMMARY

Various embodiments described herein are generally directed to a multitrack data that is stored using perpendicular and longitudinal magnetic fields. In one embodiment, a first and second track of a magnetic recording medium are read via a first reader that spans the first and second track. The first reader provides a first signal based on detecting a first total longitudinal field of the first and second tracks. The second track and a third track different from the first track are read via a second reader that spans the second and third track. The second reader is different from the first reader and provides a second signal based on detecting a second total longitudinal field of the second and third tracks. At least two of the first, second and third tracks are read via a third reader different from the first and second readers. The third reader provides a third signal based on detecting a total perpendicular field of the at least two tracks. User data is decoded from the first, second, and third signals.

In another embodiment, first and second tracks are read via a first reader that spans the first and second tracks. The first reader provides a first signal based on detecting a first total longitudinal field of the first and second tracks. Third and fourth tracks different from the first and second tracks are read via a second reader that spans the third and fourth tracks. The second reader provides a second signal based on detecting a second total longitudinal field of the third and fourth tracks. At least two tracks of the first, second, third and fourth tracks are read via a third reader that spans the at least two tracks. The third reader providing a third signal based on detecting a total perpendicular field of the at least two tracks. User data is decoded from the first, second, and third signals. These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

DETAILED DESCRIPTION

The present disclosure generally relates to data storage devices that utilize magnetic storage media, e.g., disks. Recording schemes have been developed to increase areal density for conventional magnetic recording (CMR) devices, e.g., perpendicular magnetic recording (PMR) as well as devices using newer technologies, such as heat-assisted magnetic recording (HAMR), microwave-assisted magnetic recording (MAMR) and bit-patterned media (BPM). Other recording schemes such as shingled magnetic recording (SMR) and interlaced magnetic recording (IMR) can also increase areal density by using track formats that overlap tracks to decrease effective track width. Both SMR and IMR can be together used with CMR, HAMR, MAMR, BPM, etc.

These advanced recording schemes may operate on the assumption of a one-dimensional (1-D) system design and drive architecture. On the other hand, magnetic recording media surface, in principle, provides a two-dimensional (2-D) environment. It is the system design and the resulting drive architecture which constrains inherently a 2-D system to 1-D system, mainly because of historical cost and complexity arguments. Thus, in parallel with HAMR and BPM development, the constraints limiting the overall design to 1-D are being further explored to see if the current recording technology can support higher AD and/or better drive performance if some of those constraints are modified by making the system utilize the 2-D nature of the media surface, which is called two-dimensional magnetic recording (TDMR).

In a TDMR device, multiple readers are used, and they sense magnetic fields in one direction, for example, perpendicular to the media surface for PMR. However, based on what is written on the surface of the media and the location of the reader, magnetic fields emerge in other directions which cannot be detected by the current readers employed in today's drives. In particular, a recording scheme referred to herein as vector recording or quadrature recording can increase performance by sensing both perpendicular and in-plane (or longitudinal) magnetic fields. Vector recording generally uses multiple readers over multiple tracks, overall sensing two or more orthogonal magnetic field directions of the recoding media.

Figure 1:
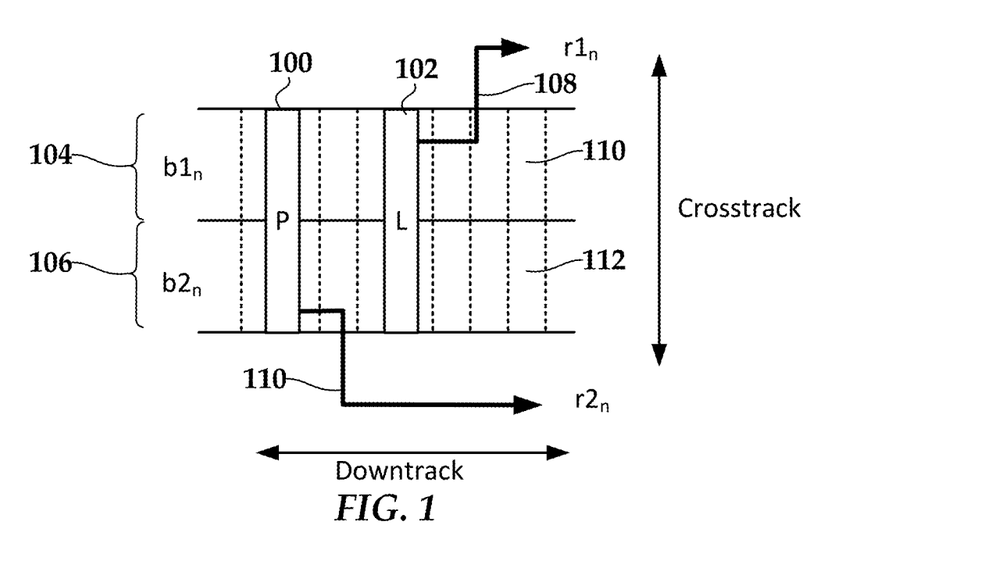
FIGS. 1 and 2 are a block diagrams illustrating vector recording schemes according to example embodiments.

In FIG. 1, a diagram illustrates a vector recording scheme according to an example embodiment. A first reader 100 (P) (also referred to herein as a read transducer) senses total, multitrack magnetic fields perpendicular to the media surface 104. A second reader 102 (L) senses total, multitrack magnetic fields in a plane parallel to the media surface 104, also referred to as in-plane or longitudinal fields. In response to detecting these fields, the first and second readers 100, 102 provide first and second signals $r1_n$, $r2_n$. Additional details of vector recording are described in U.S. patent application Ser. No. 16/048,768, filed Jul. 30, 2018, which is hereby incorporated by reference in its entirety.

In FIG. 1 and other subsequent figures, the bit boundaries of the tracks are indicated by dashed lines in a cross-track direction. In many of the embodiments described herein, the bits between two adjacent tracks are aligned so that the readers 100, 102 read bits from both tracks at the same time. These bits are referred to herein as aligned or corresponding bits. An example pair of aligned/corresponding bits 110, 112 is shown in tracks 104, 106, respectively. These bits jointly encode data that is read by the individual readers 100, 102 based on the combined magnetic field of the bits 110, 112. Note that the readers 100, 102 are offset in the downtrack direction, and so combining the signals $r1_n$, $r2_n$ from the first and second readers 100, 102 may involve buffering at least one signal as well as detecting and applying a time offset between the signals that corresponds to the downtrack separation of the readers 100, 102 at a particular location where the tracks 104, 106 are moving under the readers.

In FIG. 1, the first, perpendicular, reader 100 can sense signals when the two adjacent track bits 110, 112 are the same, while the reader amplitude will be zero if those bits are different. In the latter case, the opposing fields of the different bits will be detected by the reader 100 as zero or nearly so. While reader 100 can be used when the two adjacent track bits 110, 112 are the same, the reader 100 cannot resolve which bits 110, 112 have the positive and negative fields. The second, longitudinal reader 102 can sense signals when bits 110, 112 written at adjacent tracks have different signs, and further can tell which bit is positive and which is negative. This is because a region between the bits 110, 112 will have a crosstrack field in a direction that depends on which bit 110, 112 is positive and which is negative. Thus, the two readers 110, 112 shown in FIG. 1 can be used to jointly detect the bits written at two adjacent tracks.

This concept can be extended to more than two adjacent tracks. In case of M readers on N tracks, there are a wide range of possibilities that depend on the type of readers (e.g., "L" or "P"), reader location, and reader size. A multi-dimensional design perspective may be used to optimize the whole system for various combinations of readers and track recording schemes. In following sections, various illustrative examples are presented having different types, locations, and sizes of readers.

Figure 2:
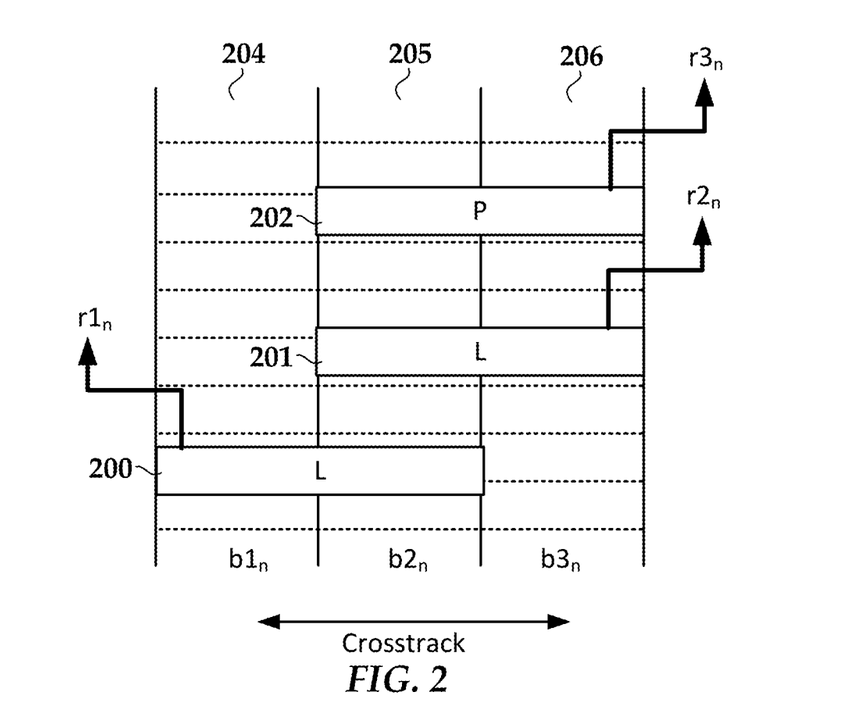

In FIG. 2, a diagram illustrates a vector recording arrangement using three readers 200-202 on three tracks 204-206 according to an example embodiment. A first reader 200 provides a first signal r1 based on detecting a first total longitudinal field of first and second tracks 204, 205. A second reader provides a second signal r2 based on detecting a second total longitudinal field of second and third tracks 205, 206. A third reader 202 provides a third signal r3 based on detecting a total perpendicular field of at least two of tracks 204-206. In this case the third reader 202 spans and reads the second and third tracks 205, 206, and not the first track 204. Although some slight overlap of the third reader 202 with the first track 204 may occur under some conditions (e.g., certain skew angles), any signals generated would be treated as crosstrack noise and not intentionally detected signals.

The readers 200-202 have about the same width in this example. Readers 200 and 201 are marked with the letter "L" indicating they are longitudinal readers while perpendicular reader 202 is marked with a "P," a convention that will be used throughout this disclosure. Also, each track 204-206 is shown with a set of first, second, and third bits b1, b2, and b3. Each rectangle in the tracks 204-206 represents a bit that is read at a given interval of time by the readers 200-202, as indicated by the subscript 'n.' Each set of bits b1, b2, and b3 are read in series to form the signals r1, r2, and r3. This convention is also used in this disclosure, and may be extended to more than three tracks and more than three sets of bits. When used to store user data, the bits b1, b2, and b3 may be arranged continuously to store an individually addressable section of user data, e.g., a sector. Within each sector, the bits b1, b2, b3 may be arranged into smaller portions, e.g., the individual words used by the encoding/decoding schemes of the write and read channels to store data. Note that these bits b1, b2, b3 may also be part of the servo data stored on the disk. This data, sometimes referred to as servo marks or servo sectors, is usually read-only and used by a servo controller to position the heads over the recording medium.

Figure 3:
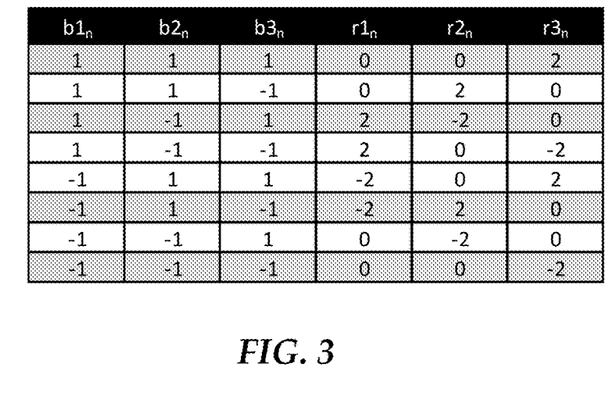
FIG. 3 is a table showing mapping of signal values of a three reader arrangement according to an example embodiment.
Figure 4:
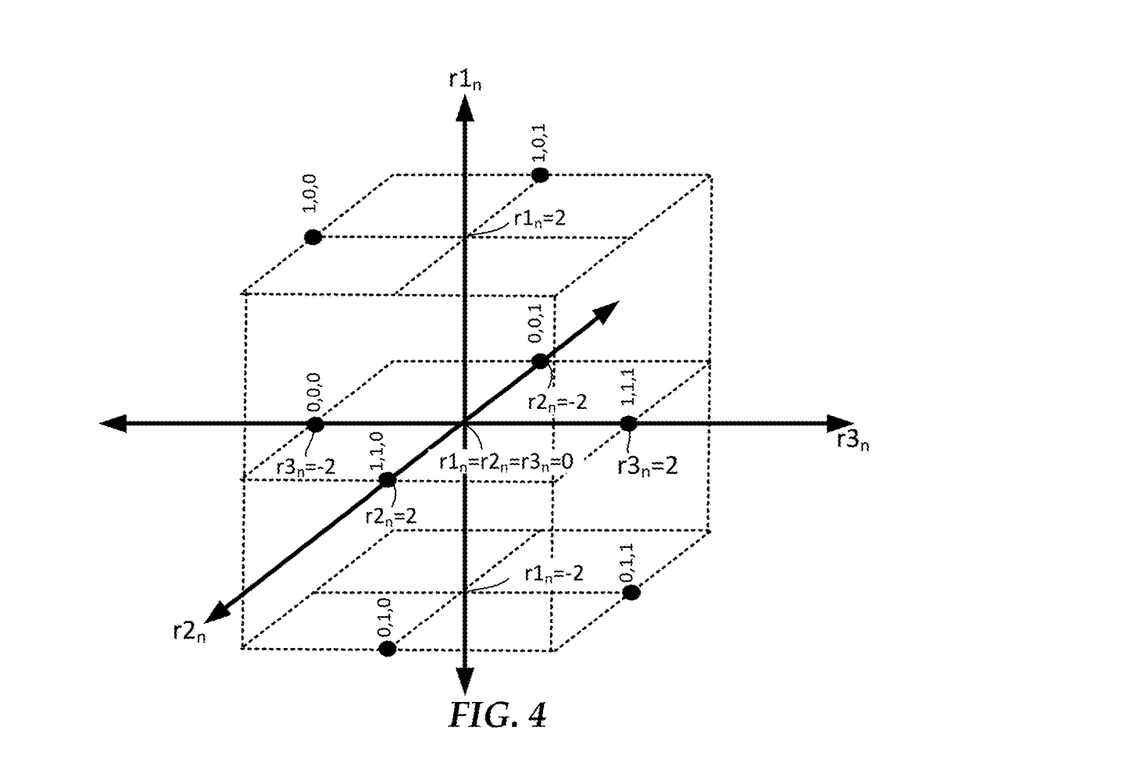
FIG. 4 is a constellation diagram showing the mapping of signal values from the table in FIG. 3.

In FIG. 3, a table 300 shows the outputs r1, r2, and r3 of readers 200-202 for values of bits b1, b2, b3 corresponding to respective tracks 204-206. The values in the table 300 are in units of bits written on media surface, such that a one indicates a single bit field in one magnetic field direction, and a negative one indicates a single bit field in the opposite direction. In FIG. 4, a three-dimensional constellation diagram shows the sequence of bits b1, b2, b3 bits corresponding to each signal node in the (r1, r2, r3) coordinate system. In this diagram, a value of −1 for the bits b1-b3 in the table 300 of FIG. 3. is mapped to a zero on the signal nodes. Thus, the second line in table 300 with (b1, b2, b3)=(1, 1, −1) corresponds to the point marked (1, 1, 0) in FIG. 4. The opposite mapping may be used in other embodiments, e.g., mapping −1 in the table 300 to a signal value of 1, and mapping a 1 in the table to a 0.

Figure 5:
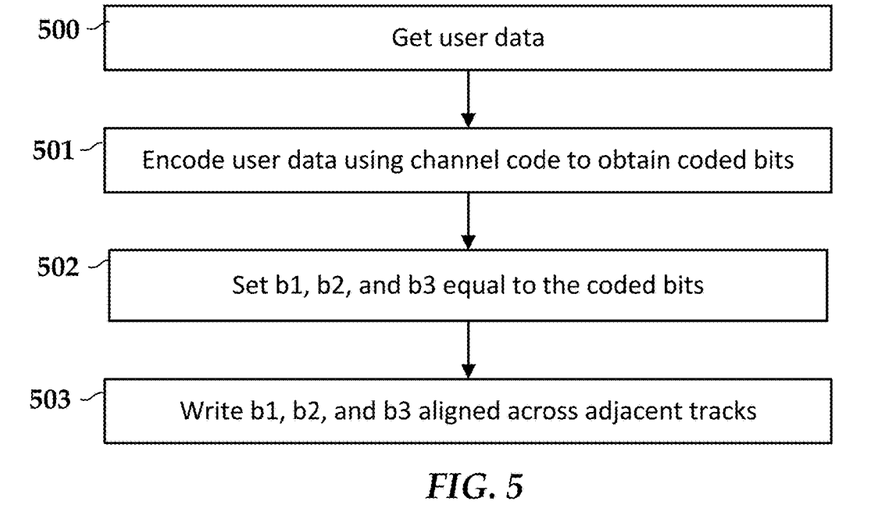
FIGS. 5 and 6 are flowcharts showing writing and reading of bits across three tracks according to example embodiments.
Figure 6:
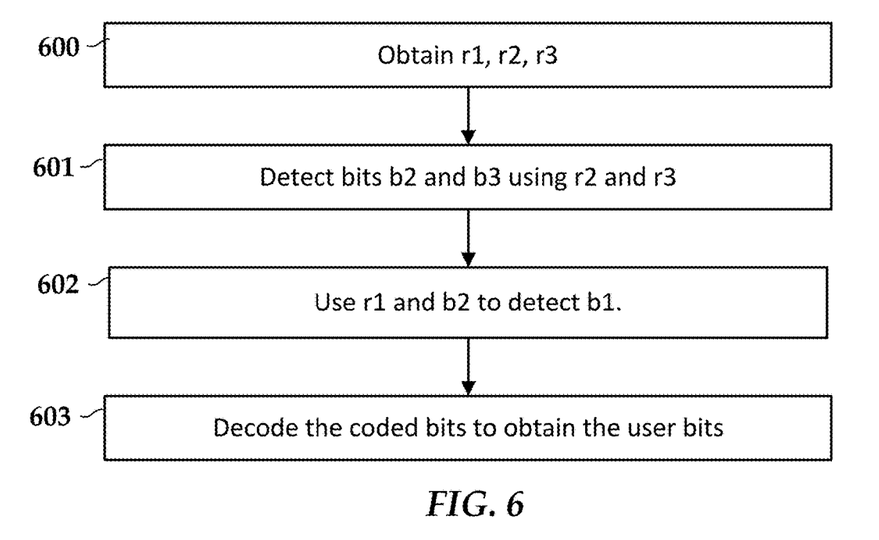

In FIGS. 5 and 6, flowcharts show examples of writing to and reading from a system as illustrated in FIG. 2. The write process, shown in FIG. 5, involves getting 500 the user data and encoding 501 it using the channel codes to obtain coded bits. The written bits b1, b2, b3 are set equal to the coded bits and written 503 aligned across three adjacent tracks. As shown in FIG. 6, the read process involves, for each set of aligned bits b1, b2, b3 across the three tracks, obtaining 600 the reader values r1, r2, and r3 then detecting 601 bits b2 and b3 using r2 and r3. Then, r1 and already detected b2 are used 602 to detect b1. The coded bits are then decoded 603 to obtain the user bits.

The reading process can be further optimized by using r1, r2, and r3 to detect b1, b2, and b3. In this case, in order to minimize errors, bit sequences assigned to neighboring signal nodes should have minimal changes in bits, e.g., a single change in bits between adjacent nodes. In this way, if the noise in the system large and a wrong signal node is detected, error in those bits will be minimized and more amenable to correction. In one embodiment, this involves applying a generalized version of three-dimensional Gray coding to the mapping shown in FIGS. 3 and 4, which results in the mapping shown in FIGS. 7 and 8.

Figure 7:
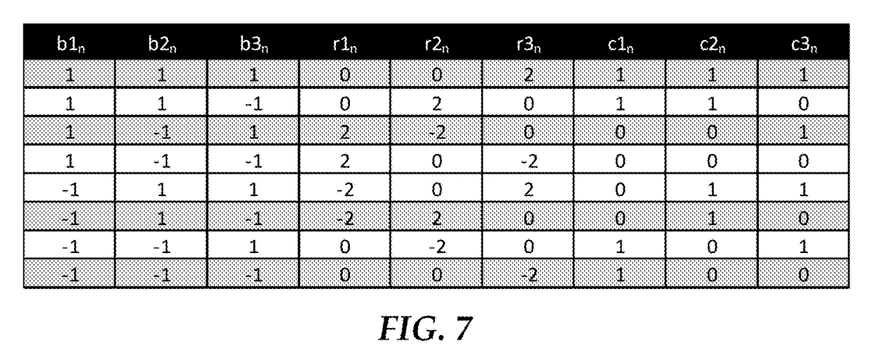
FIG. 7 is a table showing mapping of signal values of a three reader arrangement according to an example embodiment.
Figure 8:
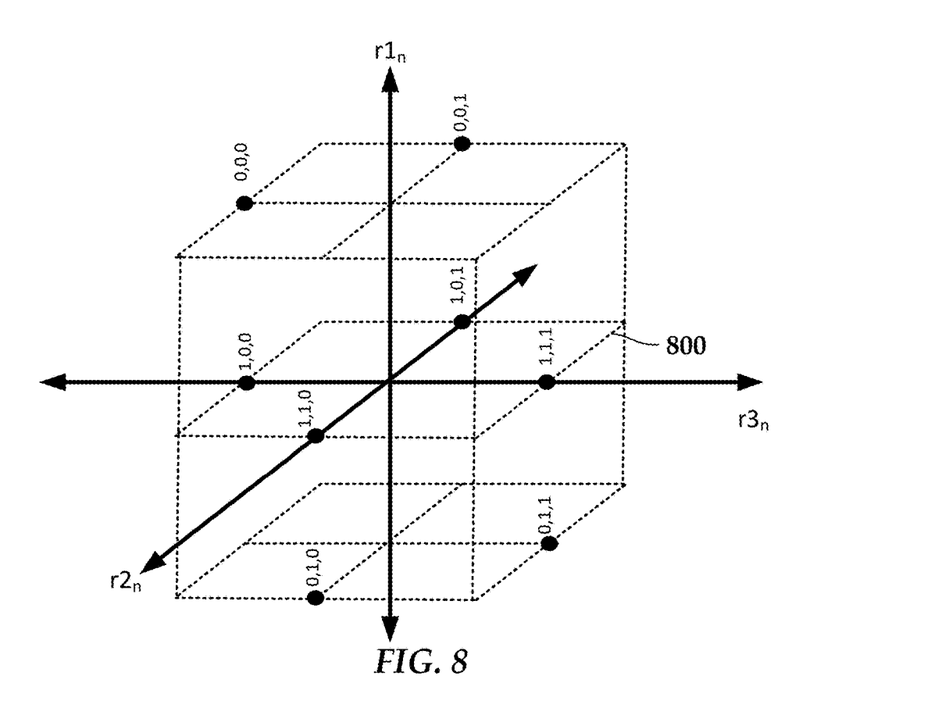
FIG. 8 is a constellation diagram showing the mapping of signal values from the table in FIG. 7.

Compared with FIGS. 3 and 4, the mapping in FIGS. 7 and 8 has only a one-bit change in the closest neighboring signal nodes. In addition to that, it also exhibits a one-bit change to the signal nodes corresponding to (r1, r2, r3)=(0, 0, 2) and (r1, r2, r3)=(0, -2, 0), as well as (r1, r2, r3)=(0, 0, -2) and (r1, r2, r3)=(0, 2, 0), all of which are shown in the r1=0 plane 800 in FIG. 8. The write and read processes for this configuration according to an example embodiment is shown in the flowcharts of FIGS. 9 and 10.

Figure 9:
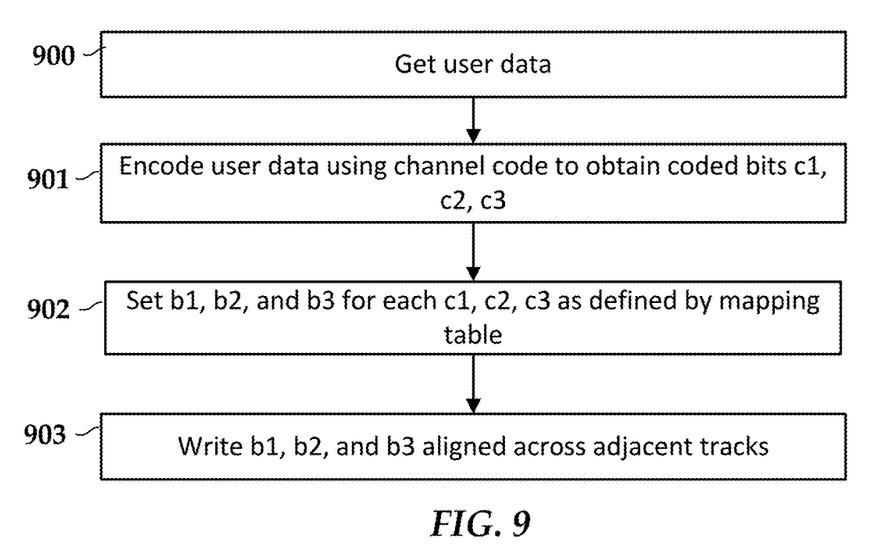
FIGS. 9 and 10 are flowcharts showing writing and reading of bits across three tracks according to example embodiments.
Figure 10:
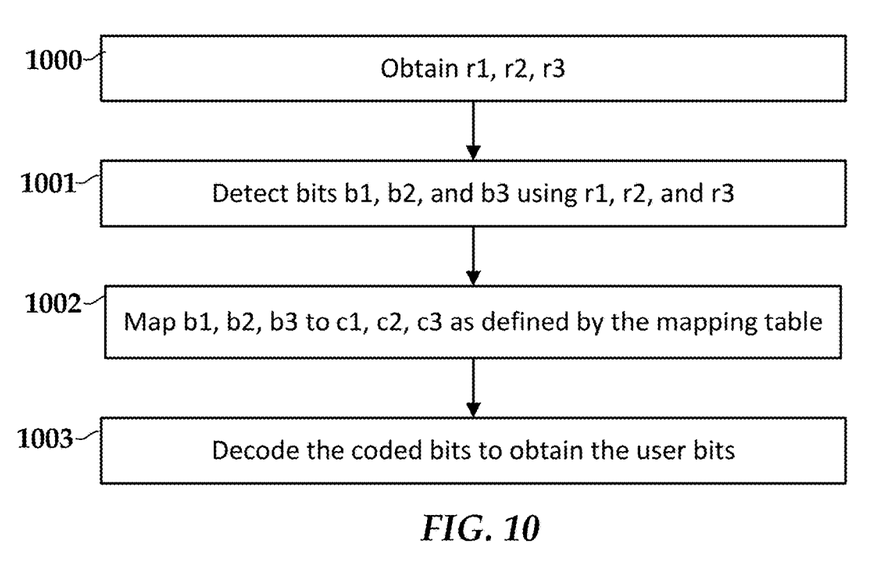

The write process, shown in FIG. 9, involves getting 900 the user data and encoding 901 it using the channel codes to obtain coded bits c1, c2, c3, which are shown in the table of FIG. 7. The written bits b1, b2, b3 are set 902 for each c1, c2, c3 as defined by the table in FIG. 7. The bits b1, b2, b3 are written 903 are aligned across adjacent tracks. As shown in FIG. 10, the read process involves, for each set of aligned bits b1, b2, b3 across the three tracks, obtaining 1000 the reader values r1, r2, and r3 then detecting 1001 bits b1, b2, and b3 using r2 and r3. Then, b1, b2, b3 are mapped 1002 to c1, c2, c3 as defined by the table in FIG. 7. The coded bits are then decoded 1003 to obtain the user bits.

Figure 11:
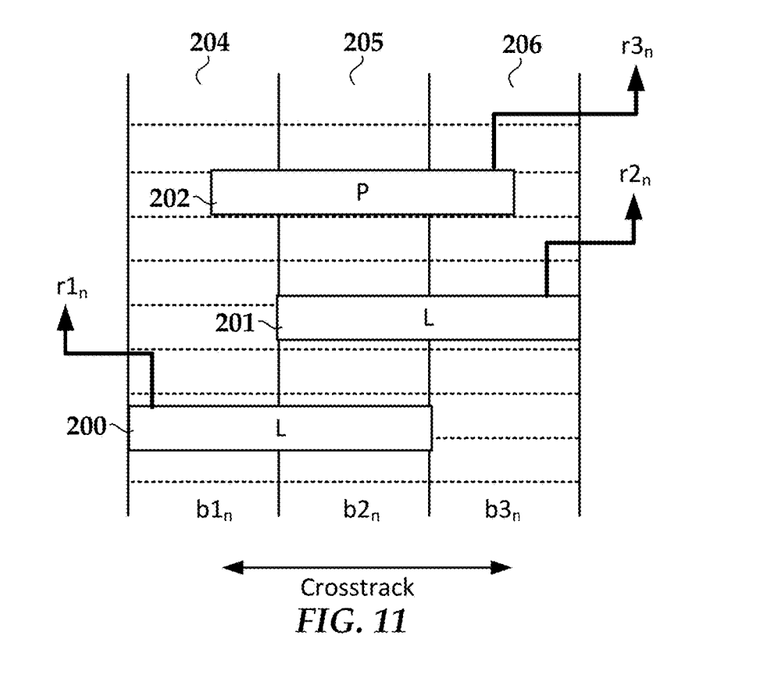
FIG. 11 is a block diagram illustrating a three-track vector recording scheme according to another example embodiment.
Figure 12:
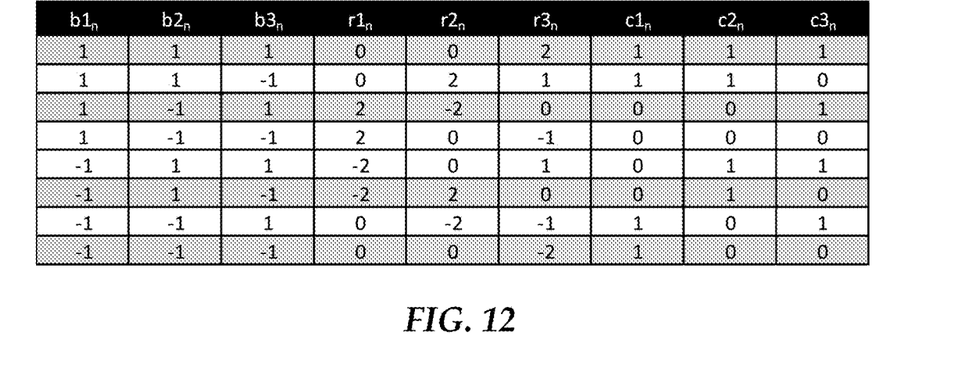
FIG. 12 is a table showing mapping of signal values of a three-reader, three-track arrangement according to another example embodiment.

In FIG. 11, a diagram shows another arrangement of readers according to an example embodiment. This embodiment uses similar first, second, and third readers 200-202 over first, second and third tracks 204-206 as previously shown, except that the third, perpendicular reader 202 is located such that it fully spans the second track 205 and partially spans (e.g., between 40-60%) of the first and third tracks. The mapping of signals to bits is shown in the table of FIG. 12 and the signal constellation shown in FIG. 13. When compared to the signal constellation in FIG. 8, the signal constellation in FIG. 13 has larger minimum distances between the closest neighboring signal nodes, indicating that this system is more robust to noise.

Figure 13:
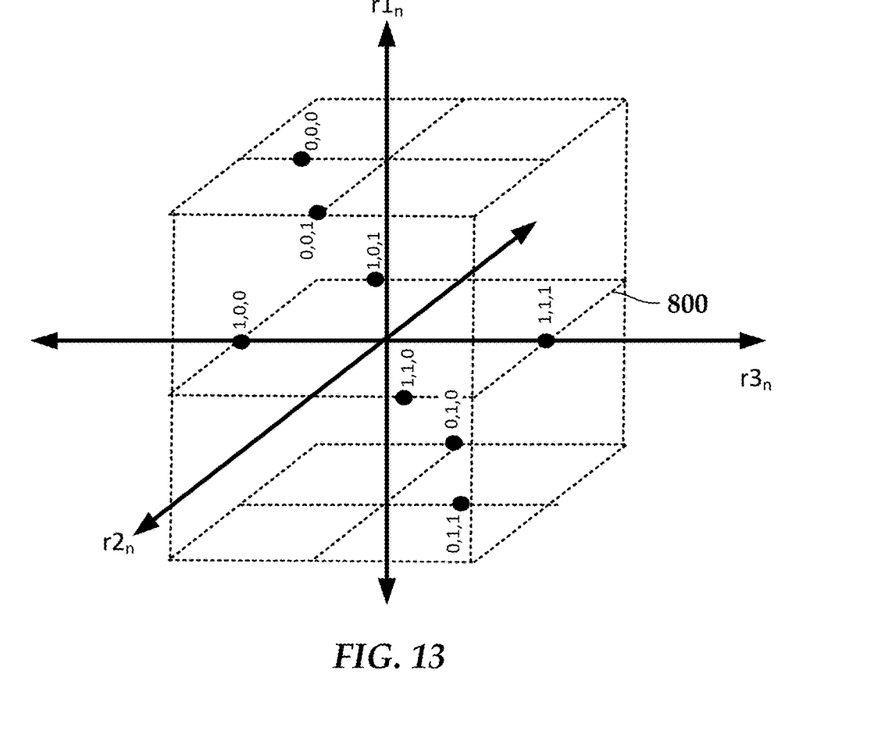
FIG. 13 is a constellation diagram showing the mapping of signal values from the table in FIG. 12.

The architectures in FIGS. 7-8 and FIGS. 12-13 can be also specific cases that might be observed in a drive at different skew angles. The readers associated with r1 and r3 might be located as shown in FIG. 2 for one extreme skew angle and located as shown in FIG. 11 in the other extreme. Since the system in FIGS. 12-13 is more robust to noises, a zone-dependent, different channel ECC can be selected as a function of the location of readers, e.g., at different skew angles.

Figure 14:
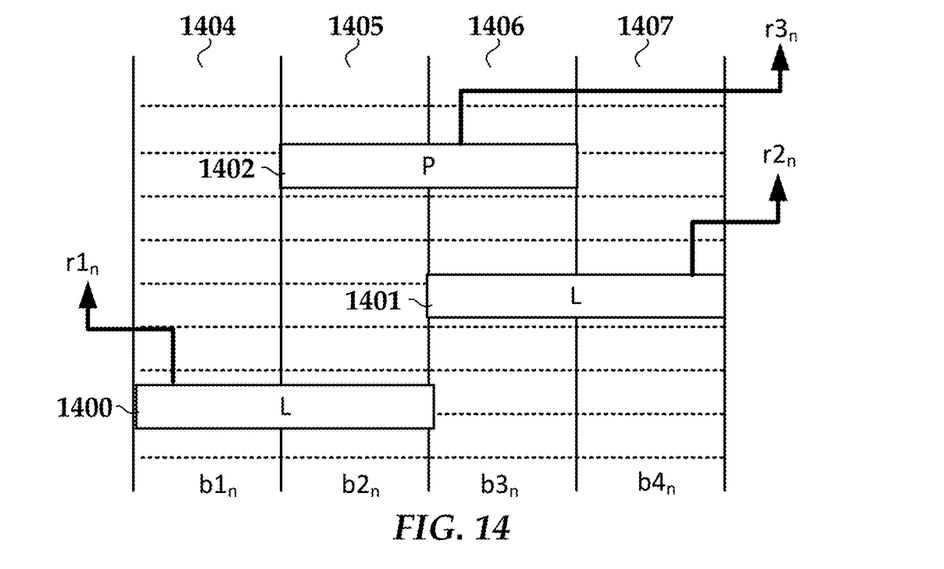
FIG. 14 is a block diagram illustrating a four-track, vector recording scheme according to another example embodiment.

In FIG. 14, a diagram shows an arrangement of readers according to another example embodiment. Three readers 1400-1402 similar to the previously described readers 200-202 are positioned over four tracks 1404-1407. First reader 1400 spans first and second tracks 1404, 1405 and provides a first signal r1 based on detecting a first total longitudinal field of the first and second tracks 1404, 1405. Second reader 1401 spans the third and fourth tracks 1406, 1407 and provides a second signal r2 based on detecting a second total longitudinal field of the third and fourth tracks 1406, 1407. A third reader 1402 spans the at least two of the four tracks 1404-1407 and provides a third signal r3 based on detecting a total perpendicular field of the at least two tracks. In this case, the third reader 1402 spans the second and third tracks 1405, 1406, and not the first and fourth tracks 1404, 1407 (at least not for purposes of detecting magnetic fields, as some adjacent track encroachment may occur in operation).

Figure 15:
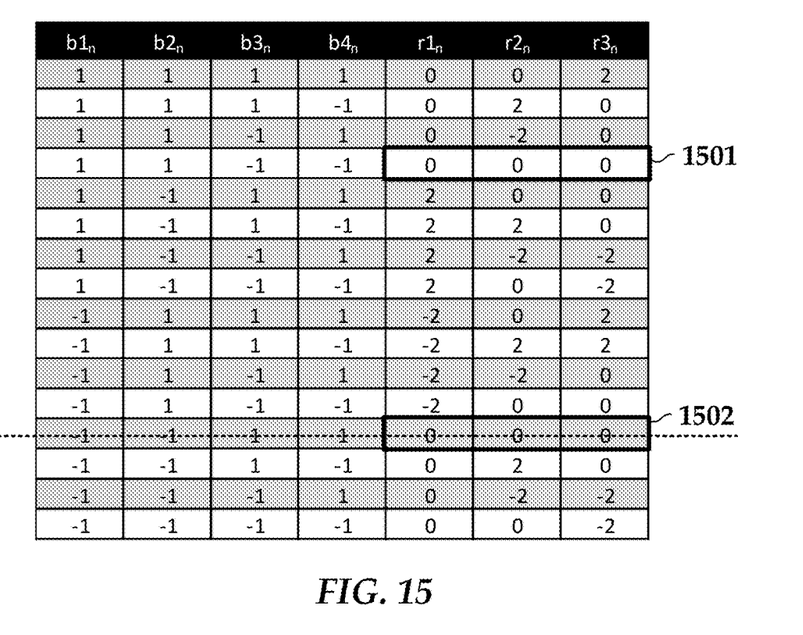
FIG. 15 is a table showing mapping of signal values of a three reader arrangement according to another example embodiment.

The table in FIG. 15 illustrates a mapping of reader outputs r1, r2, and r3 the values of bits b1-b4. There are sixteen different combinations of four-bit sequences that can be written on each track, however the readers yield fifteen different combinations, with (b1, b2, b3, b4) equal to (1,1,-1,-1) and (-1,-1,1,1) yielding the same (r1, r2, r3) equal to (0,0,0), as indicated by the highlighted sections 1501, 1502.

By eliminating one of the redundant bit sequences 1501, 1502, as indicated by the dashed line, fifteen distinct signal levels are available for (r1, r2, r3).

For this specific case, a look-up table for mapping between coded bits (c1, c2, . . . ) and written bits (b1, b2, . . . ), similar to the tables of FIGS. 7 and 12 can be obtained by getting bits (b1, b2, b3, b4) at time instances n, n+1, and n+2, total of twelve bits. This results into fifteen distinct levels for (r1, r2, r3) at each time instant, and therefore overall 15*15*15=3375 distinct levels exist for (r1, r2, r3) at n, n+1, n+2. From this, 2048 levels can be chosen that maximizes the minimum distance between closest neighboring signal nodes in signal constellation. The 11 bits are assigned to the 2048 levels that minimizes the difference in bits between the closest neighboring signal nodes. This results in a system with a mapping rate of 11 bits (output)/12 bits (input)=0.9167. This loses capacity compared to the specific case as shown in FIG. 1, but in return can process four tracks of data using three readers instead of four readers.

Figure 16:
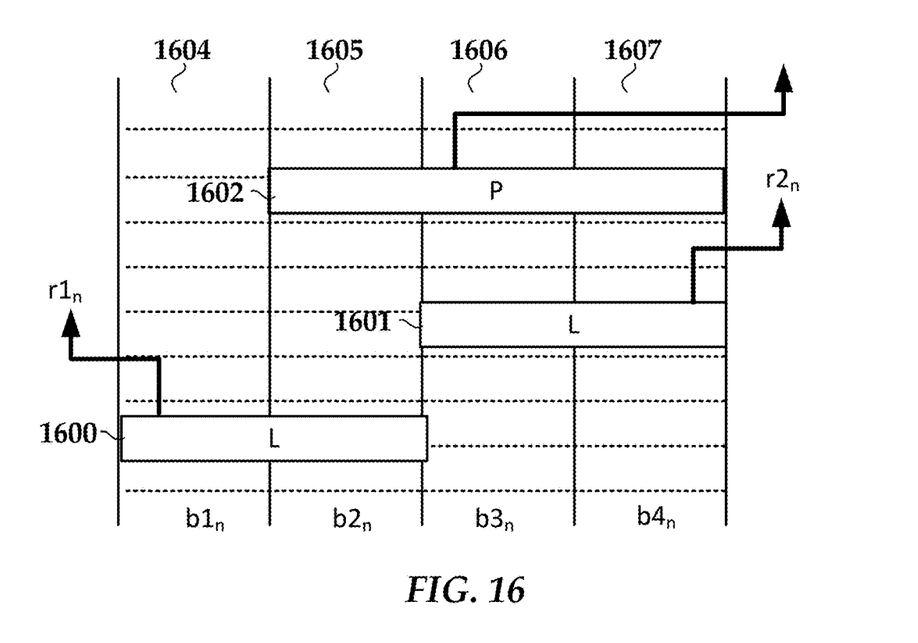
FIG. 16 is a block diagram illustrating a four-track vector recording scheme according to another example embodiment.
Figure 17:
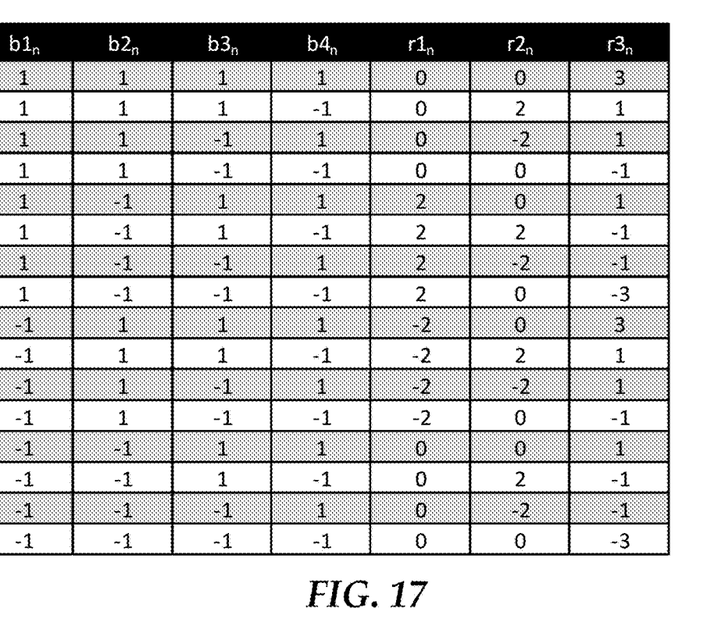
FIG. 17 is a table showing mapping of signal values of a three reader arrangement according to another example embodiment.

Another arrangement with three readers on four tracks according to an example embodiment is shown in FIGS. 16 and 17. Three readers 1600-1602 are positioned over four tracks 1604-1607 as seen in FIG. 16. First reader 1600 spans first and second tracks 1604; 1605 and provides a first signal r1 based on detecting a first total longitudinal field of the first and second tracks 1604; 1605. Second reader 1601 spans the third and fourth tracks 1606, 1607 and provides a second signal r2 based on detecting a second total longitudinal field of the third and fourth tracks 1606, 1607. A third reader 1602 spans three of the four tracks 1604-1607 and provides a third signal r3 based on detecting a total perpendicular field of the at least two tracks. In this case, the third reader 1602 spans the second, third, and fourth tracks 1605-1607, and not the first track 1604.

Compared to previous examples, the perpendicular reader 1602 is wider and spans three tracks, while the longitudinal readers 1600-1601 span two tracks each as before. As indicated by the table in FIG. 17, all sixteen different combinations of four-bit sequences result into sixteen distinct (r1, r2, r3) values. Thus, this architecture does not have any mapping loss like the previous one. However, this arrangement has signal nodes closer to each other, which results into more errors in detecting the correct signal node. Also, some of the closest neighboring signal nodes will have to have more than a one-bit difference, which increases the bit error rate when signal nodes are detected wrong. As a result, the choice between the architectures shown in FIGS. 14-15 and FIGS. 16-17 may depend on the system parameters, like expected noise of the system.

Figure 18:
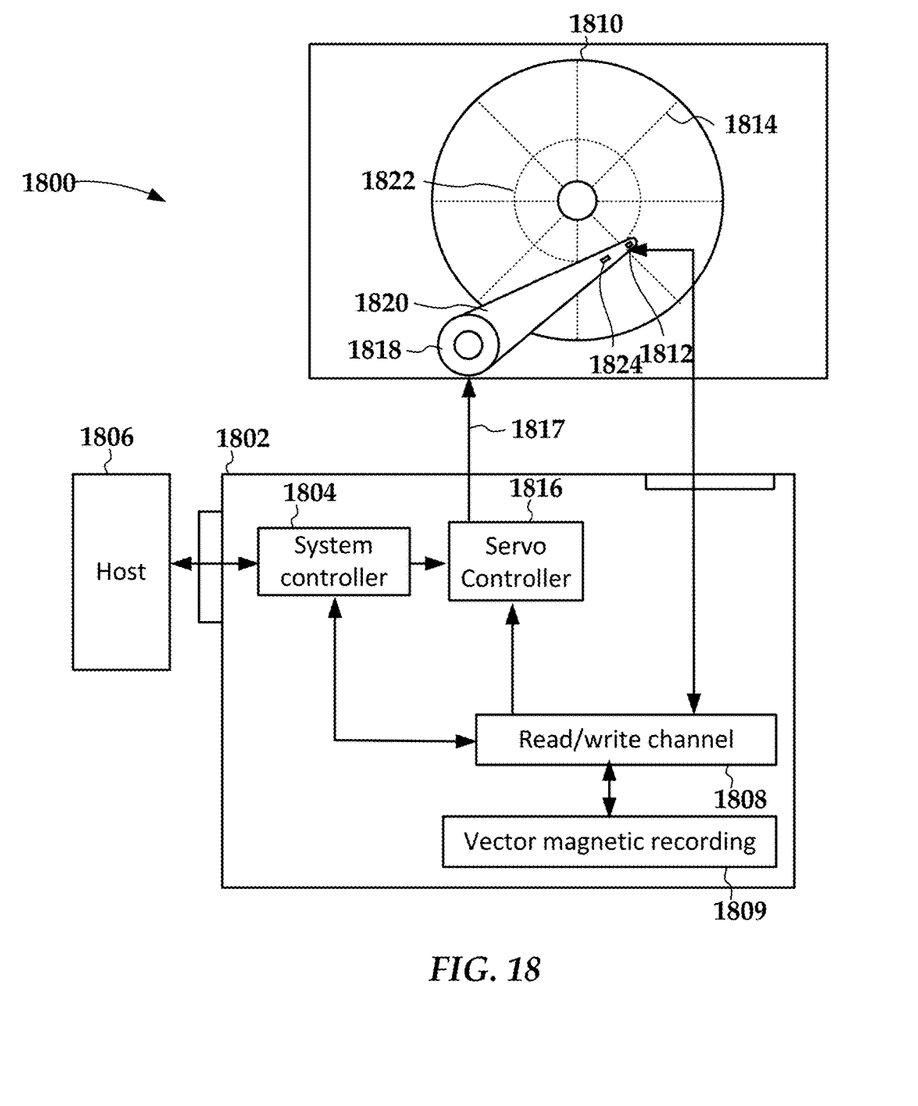
FIG. 18 is a block diagram of an apparatus according to an example embodiment.

In FIG. 18, a diagram illustrates components of a storage drive apparatus 1800 that utilizes one or more read/write heads 1812 according to example embodiments. The read/write head 1812 is mounted to a head-gimbal assembly and at least one of the heads 1812 or head-gimbal assemblies is configured with first, second, and third read transducers, or readers. The first reader spans a first and second track of the disk 1810 and provides a first signal responsive to a first total longitudinal field of the first and second tracks. The second reader spans two other tracks, at least one of the two other tracks being different from the first and second tracks. The second reader provides a second signal responsive to a second total longitudinal field of the two other tracks. The third reader spans two or more of the tracks and provides a third signal responsive to a total perpendicular field of the two or more tracks.

The apparatus includes circuitry 1802 such as a system controller 1804 that processes read and write commands and associated data from a host device 1806. The host device 1806 may include any electronic device that can be communicatively coupled to store and retrieve data from a data storage device, e.g., a computer. The system controller 1804 is coupled to a read/write channel 1808 that reads from and writes to surfaces of one or more magnetic disks 1810. The read/write channel 1808 generally converts data between the analog signals used by the heads 1812 to the digital data used by the system controller 1804 for host communications.

The read/write channel 1808 may include analog and digital circuitry such as detectors, timing-correction units, equalizers, error correction units, preamplifiers, filters, digital-to-analog converters, analog-to-digital converters, etc. The read/write channel 1808 may have particular features that facilitate reading the first and second signals. For example, the read/write channel may have analog front ends, equalizers, and detectors that are specially tuned for the particular perpendicular and longitudinal fields of the readers as well as the characteristic signals produced by these fields in particular recording patterns.

The read/write channel may utilize servo data (described below) to detect head position and use this to estimate the effects of skew on downtrack separation of the readers. The skew estimations may also be used to set different mappings between reader signals and bit values, e.g., as in the different configuration shown in FIGS. 2 and 11. The write sections of the write channel may also have features that ensure corresponding bits in adjacent tracks are aligned within each data sector. The write channel may also jointly encode aligned bits within data sectors before the bits are written to the individual tracks/subtracks. Some of these features may be included in firmware instructions, as indicated by vector magnetic recording module 1809.

In addition to processing user data, the read/write channel 1808 reads servo data from servo wedges 1814 on the magnetic disk 1810 via the read/write head. All of the multiple readers of the read/write head may be used to read servo data, or only a subset thereof. The servo data are sent to a servo controller 1816, which uses the data to provide position control signals 1817 to an actuator such as a voice coil motor (VCM) 1818. The VCM 1818 rotates an arm 1820 upon which the read/write heads 1812 are mounted in response to the control signals 1817. The position control signals 1817 may also be sent to microactuators 1824 that individually control each of the read/write heads 1812, e.g., causing small displacements at each head. The apparatus 1800 may include multiple arms and VCMs (not shown), such that a surface of the disk 1810 can be accessed by multiple heads driven by different VCMs.

Figure 19:
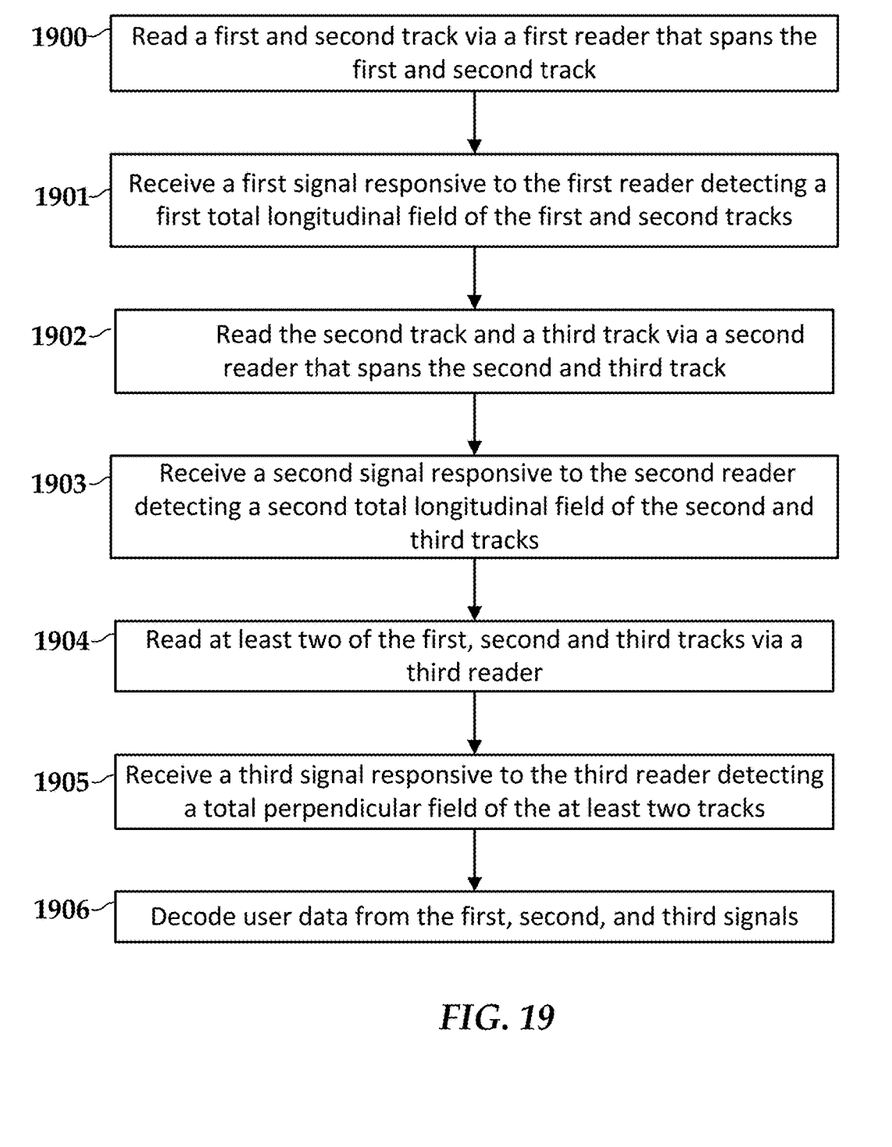
FIGS. 19-20 are flowcharts of methods according to example embodiments.

In reference now to FIG. 19, a flowchart illustrates a method according to an example embodiment. The method involves reading 1900 a first and second track of a magnetic recording medium via a first reader that spans the first and second track. A first signal is received 1901 responsive to the first reader detecting a first total longitudinal field of the first and second tracks. The second track and a third track different from the first track are read 1902 via a second reader that spans the second and third track. The second reader is different from the first reader. A second signal is received 1903 responsive to the second reader detecting a second total longitudinal field of the second and third tracks. At least two of the first, second and third tracks are read 1904 via a third reader different from the first and second readers. A third signal is received 1905 responsive to the third reader detecting a total perpendicular field of the at least two tracks. User data is detected from the first, second, and third signals.

Figure 20:
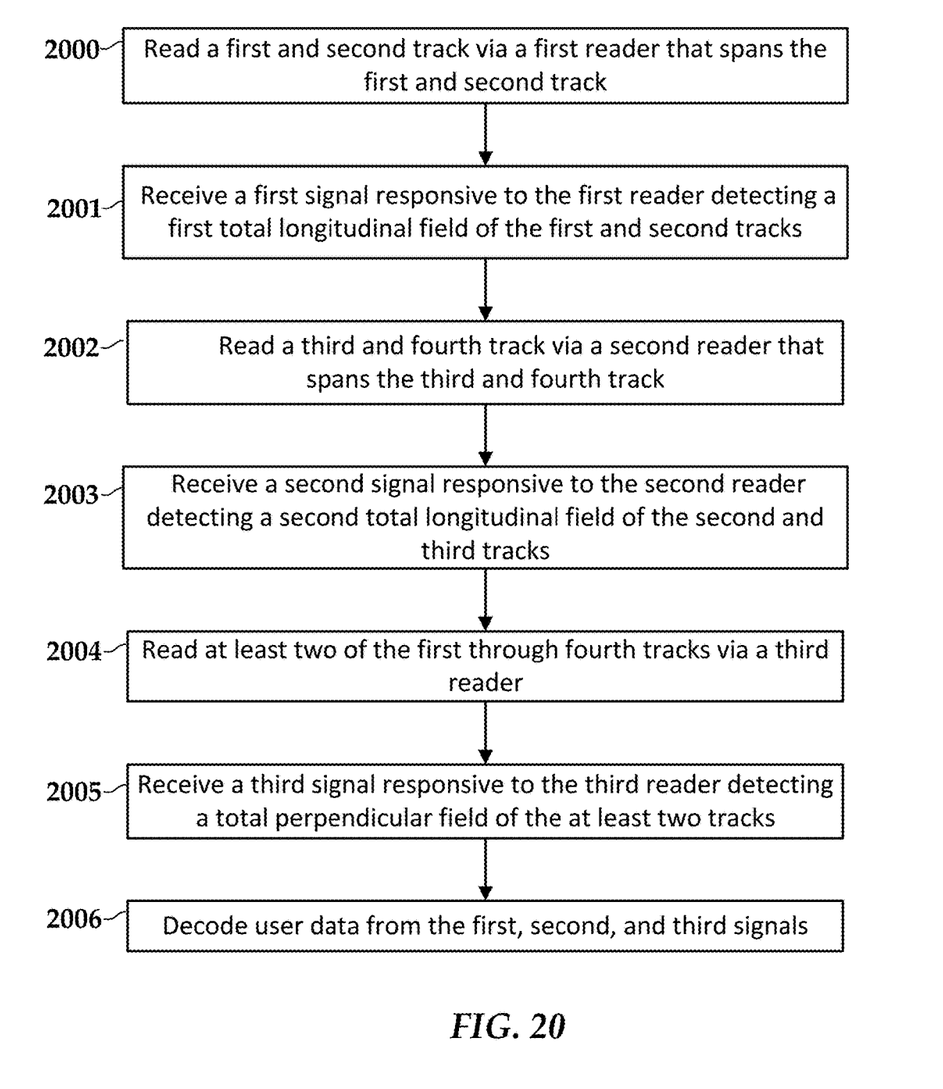

In FIG. 20, a flowchart illustrates a method according to another example embodiment. The method involves reading 2000 a first and second track via a first reader that spans the first and second track. A first signal is received 2001 responsive to the first reader detecting a first total longitudinal field of the first and second tracks. A third and fourth track different from the first and second track are read 2002 via a second reader that spans the third and fourth track. A second signal based 2003 is received responsive to the second reader detecting a second total longitudinal field of the third and fourth tracks. At least two tracks of the first, second, third and fourth tracks are read 2004 via a third reader that spans the at least two tracks. A third signal is received responsive to the third reader detecting a total perpendicular field of the at least two tracks. Data is decoded 2006 from the first, second, and third signals.

Note that in any of the above embodiments, the first, second, and third readers are generally configured to provide the first, second, and third signals simultaneously, because all of the readers may be mounted on the same head or head-gimbal assembly that is held over the multiple tracks at the same time. Because the readers may have a fixed or known downtrack offset from each other, the decoding of user data may also involve buffering or otherwise time-delaying processing on some or all of the signals so that portions of the signals corresponding to aligned bits of adjacent tracks can be processed together.

In the above description, a multi-dimensional system for vector recording was described. The embodiments generally employ M readers on N tracks, where M≥3 and N≥3. The approach is general, and can be applied to any kind of architecture option utilizing different type (e.g., "L" or "P"), location, and size readers. Variations on the illustrated embodiments may include ordering of readers and/or tracks different than what is described above. For example, while the enumerated readers and tracks are illustrated as being ordered from left to right in the figures, a right to left ordering may also be employed. Similarly, reader-to-reader offsets may be employed that are different than what is shown. For example, in FIG. 2, the third reader 202 may alternately be located between the first and second readers 200, 201 in the downtrack direction while still spanning the indicated tracks. Also, the downtrack separation between readers may be different, such that the downtrack distance between readers 200, 201 is different than downtrack distance between readers 201, 202. This variation in downtrack location may apply to any of the other embodiments.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

The various embodiments described above may be implemented using circuitry, firmware, and/or software modules that interact to provide particular results. One of skill in the arts can readily implement such described functionality, either at a modular level or as a whole, using knowledge generally known in the art. For example, the flowcharts and control diagrams illustrated herein may be used to create computer-readable instructions/code for execution by a processor. Such instructions may be stored on a non-transitory computer-readable medium and transferred to the processor for execution as is known in the art. The structures and procedures shown above are only a representative example of embodiments that can be used to provide the functions described hereinabove.

The foregoing description of the example embodiments has been presented for the purposes of illustration and description, and is not intended to be exhaustive or to limit the invention to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. A method, comprising:
   reading a first and second track of a magnetic recording medium via a first reader that spans the first and second track, the first reader providing a first signal based on detecting a first total longitudinal field of the first and second tracks;
   reading the second track and a third track different from the first track via a second reader that spans the second and third track, the second reader different from the first reader and providing a second signal based on detecting a second total longitudinal field of the second and third tracks;
   reading at least two of the first, second and third tracks via a third reader different from the first and second readers, the third reader providing a third signal based on detecting a total perpendicular field of the at least two tracks; and
   decoding user data from the first, second, and third signals.

2. The method of claim 1, wherein the third reader spans the second and third tracks and not the first track.

3. The method of claim 2, wherein decoding the data comprises, for each first, second and third aligned bits of the respective first second and third tracks:
   based on the second and third signals, detecting the second and third bits;
   based on the second bit and the first signal, detecting the first bit; and
   decoding the first, second and third bits to obtain the user data.

4. The method of claim 2, wherein decoding the data comprises, for each first, second and third aligned bits of the respective first second and third tracks:
   based on the first, second, and third signals, detecting the first; second, and third bits;
   determining first, second, and third Gray-coded bits that are mapped to the first second and third bits; and
   decoding the first, second and third Gray-coded bits to obtain the user data.

5. The method of claim 1, wherein the third reader fully spans the second track and partially spans the first and third tracks.

6. The method of claim 5, wherein decoding the data comprises, for each first, second and third aligned bits of the respective first second and third tracks:
   based on the first, second, and third signals, detecting the first, second, and third bits;
   determining first, second, and third Gray-coded bits that are mapped to the first second and third bits; and
   decoding the first, second and third Gray-coded bits to obtain the user data.

7. The method of claim 1, wherein at a first skew angle, the third reader spans the second and third tracks and not the first track, and at a second skew angle, the third reader fully spans the second track and partially spans the first and third tracks, and wherein a different decoding is used at the first and second skew angles.

8. The method of claim 1, further comprising:
   jointly encoding the user data into sets of first, second, and third bits; and
   writing the sets of first, second, and third bits aligned across the respective first, second and third tracks, the sets of first, second, and third bits inducing the first, second, and third signals, respectively.

9. An apparatus comprising:
   a read channel coupled to receive:
      a first signal from a first reader that spans a first and second track of a magnetic recording medium, the first signal responsive to a first total longitudinal field of the first and second tracks;
      a second signal from a second reader different from the first reader that spans the second and a third track different from the first track, the second signal responsive to a second total longitudinal field of the second and third tracks; and
      a third signal from a third reader different from the first and second readers that spans at least two tracks of the first, second and third tracks, the third signal responsive to a total perpendicular field of the at least two tracks; and
   a controller coupled to the read channel and operable to jointly decode user data from the first, second, and third signals.

10. The apparatus of claim 9, wherein the third reader spans the second and third tracks and not the first track.

11. The apparatus of claim 10, wherein decoding the data comprises, for each first, second and third aligned bits of the respective first second and third tracks:
    based on the second and third signals, detecting the second and third bits;
    based on the second bit and the first signal, detecting the first bit; and
    decoding the first, second and third bits to obtain the user data.

12. The apparatus of claim 10, wherein decoding the data comprises, for each first, second and third aligned bits of the respective first second and third tracks:
    based on the first, second, and third signals, detecting the first, second, and third bits;
    determining first, second, and third Gray-coded bits that a e mapped to the first second and third bits; and
    decoding the first, second and third Gray-coded bits to obtain the user data.

13. The apparatus of claim 9, wherein the third reader fully spans the second track and partially spans the first and third tracks.

14. The apparatus of claim 13, wherein decoding the data comprises, for each first, second and third aligned bits of the respective first second and third tracks:
    based on the first, second, and third signals, detecting the first, second, and third bits;
    determining first, second, and third Gray-coded bits that are mapped to the first second and third bits; and
    decoding the first, second and third Gray-coded bits to obtain the user data.

15. The apparatus of claim 9, wherein at a first skew angle, the third reader spans the second and third tracks and not the first track, and at a second skew angle, the third reader fully spans the second track and partially spans the first and third tracks, and wherein a different decoding is used at the first and second skew angles.

16. The apparatus of claim 9, wherein the first, second, and third head are part of a same head-gimbal assembly.

17. A method, comprising:
   reading first and second tracks via a first reader that spans the first and second tracks, the first reader providing a first signal based on detecting a first total longitudinal field of the first and second tracks;
   reading third and fourth tracks different from the first and second tracks via a second reader that spans the third and fourth tracks, the second reader providing a second signal based on detecting a second total longitudinal field of the third and fourth tracks;
   reading at least two tracks of the first, second, third and fourth tracks via a third reader that spans the at least two tracks, the third reader providing a third signal based on detecting a total perpendicular field of the at least two tracks; and
   decoding user data from the first, second, and third signals.

18. The method of claim 17, wherein the third reader spans the second and third tracks and not the first and fourth tracks.

19. The method of claim 17, wherein the third reader spans the second, third, and fourth tracks and not the first track.

20. The method of claim 17, wherein the first, second, and third signals are based on reading sets of first, second, third and fourth bits that are aligned respectively with each other across the first, second, third and fourth tracks.

* * * * *